(12) United States Patent
Hecht et al.

(10) Patent No.: US 12,266,921 B2
(45) Date of Patent: Apr. 1, 2025

(54) INSTALLATION INCLUDING A STORED ENERGY SOURCE AND AN ELECTRIC MOTOR WHICH CAN BE FED BY AN INVERTER, AND METHOD FOR OPERATING AN INSTALLATION

(71) Applicant: SEW-EURODRIVE GMBH & CO. KG, Bruchsal (DE)

(72) Inventors: Dominik Hecht, Waldburg (DE); Hubert Heine, Eberhardzell (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 464 days.

(21) Appl. No.: 17/779,820

(22) PCT Filed: Nov. 3, 2020

(86) PCT No.: PCT/EP2020/025485
§ 371 (c)(1),
(2) Date: May 25, 2022

(87) PCT Pub. No.: WO2021/104664
PCT Pub. Date: Jun. 3, 2021

(65) Prior Publication Data
US 2023/0031711 A1 Feb. 2, 2023

(30) Foreign Application Priority Data
Nov. 29, 2019 (DE) .......................... 102019008309.1

(51) Int. Cl.
*H02H 7/122* (2006.01)
(52) U.S. Cl.
CPC ........ *H02H 7/1225* (2013.01); *H02H 7/1222* (2013.01)
(58) Field of Classification Search
CPC .......................... H02H 7/1225; H02H 7/1222
See application file for complete search history.

(56) References Cited

U.S. PATENT DOCUMENTS

| 2012/0112693 A1* | 5/2012 | Kusch ..................... B60L 58/20 320/109 |
| 2013/0181681 A1* | 7/2013 | Mukai ................... H02J 7/0013 320/128 |

(Continued)

FOREIGN PATENT DOCUMENTS

| DE | 1033765 B | 7/1958 |
| DE | 102013012578 A1 | 2/2015 |
| JP | 2017061186 A | 3/2017 |

OTHER PUBLICATIONS

International Search Report issued in corresponding International Application No. PCT/EP2020/025485 dated Dec. 17, 2020, pp. 1-2, English Translation.

(Continued)

*Primary Examiner* — Jue Zhang
(74) *Attorney, Agent, or Firm* — Carter, DeLuca & Farrell LLP

(57) ABSTRACT

In an installation including a stored energy source and an electric motor which can be fed by an inverter, and a method for operating an installation, the stored energy source forms an electrical series circuit with a first fuse and further fuse(s). A controllable contact, e.g., a switch, a contactor, etc., is connected in parallel to the further fuse, or a respective controllable contact, e.g., a switch, a contactor, etc., is connected in parallel to each of the further fuses. The series circuit feeds the DC-voltage-side connection of the inverter, and a device for detecting the voltage applied to the series circuit is connected to control electronics which generate a control signal for the contact or control signals for the controllable contacts. For example, the respective contact is opened when the voltage falls below a respective voltage threshold.

25 Claims, 2 Drawing Sheets

(56) References Cited

U.S. PATENT DOCUMENTS

2019/0140245 A1    5/2019  Mensch et al.
2021/0316624 A1*  10/2021  Stengert .............. H02M 7/4833

OTHER PUBLICATIONS

International Report on Patentability issued in corresponding International Application No. PCT/EP2020/025485 dated May 17, 2022, pp. 1-8, English Translation.

* cited by examiner

INSTALLATION INCLUDING A STORED ENERGY SOURCE AND AN ELECTRIC MOTOR WHICH CAN BE FED BY AN INVERTER, AND METHOD FOR OPERATING AN INSTALLATION

FIELD OF THE INVENTION

The present invention relates to an installation that includes, for example, a stored energy source and an electric motor which can be fed by an inverter, and a method for operating an installation.

BACKGROUND INFORMATION

In certain conventional arrangements, an inverter can be fed from a stored energy source which is connected to the DC-voltage-side connection of an inverter. Capacitors or accumulators can be used as stored energy sources.

Additionally, fuses are tripped when a tripping current is exceeded.

A device for protecting an electrical line is described in German Patent Document No. 10 2013 012 578.

A power distribution unit and an energy management system for an electric car are described in U.S. Patent Application Publication No. 2019/0140245.

SUMMARY

Example embodiments of the present invention provide for improving the safety of installations with inverters.

According to an example embodiment of the present invention, in an installation with a stored energy source, the stored energy source forms an electrical series circuit with a first fuse and one or more further fuses. A controllable contact, e.g., a switch, a contactor, etc., is connected in parallel to the further fuse, or a respective controllable contact, e.g., a switch, a contactor, etc., is connected in parallel to each of the further fuses, and a device for detecting the voltage applied to the series circuit is connected to control electronics which generate a control signal for the contact or control signals for the controllable contacts. For example, the respective contact is opened when the voltage falls below a respective voltage threshold.

The advantage is that another respective fuse ensures protection as a function of the voltage. It is thus taken into account that the internal resistance of the stored energy source limits the maximum possible short-circuit current to a lower value at lower voltages than at higher voltages. Safety and protection are thus improved, since the first fuse is not able to detect a short-circuit current in a voltage range below the first threshold, i.e., voltage threshold, and therefore does not trip either.

The fuses are, for example, of the same configuration, so that the characteristic curves of different fuses do not intersect, and the characteristic curves each represent the tripping current as a function of the duration of the current applied.

According to an example embodiment of the present invention, an installation includes a stored energy source and an electric motor that can be fed by an inverter, and the stored energy source forms an electrical series circuit with a first fuse and one or more further fuses. A controllable contact, e.g., a switch, a contactor, etc., is connected in parallel to the further fuse, or a respective controllable contact, e.g., a switch, a contactor, etc., is connected in parallel to each of the further fuses, and the series circuit feeds the DC-voltage-side connection of the inverter. A device for detecting the voltage applied to the series circuit is connected to control electronics which generate a control signal for the contact or control signals for the controllable contacts, and, for example, the respective contact is opened when the voltage falls below a respective voltage threshold.

The advantage is that another respective fuse ensures protection as a function of the voltage, for example, due to a short-circuit in the power electronics of the inverter or at one of the connections of the inverter. It is thus taken into account that the internal resistance of the stored energy source limits the maximum possible short-circuit current to a lower value at lower voltages than at higher voltages. Safety and protection are thus improved, since the first fuse is not able to detect a short-circuit current in a voltage range below the first threshold, i.e., voltage threshold, and therefore does not trip either.

The fuses are, for example, of the same configuration, so that the characteristic curves of different fuses do not intersect, and the characteristic curves each represent the tripping current as a function of the duration of the current applied.

According to example embodiments, the control electronics have a comparison device, which compares the voltage with one or more thresholds and generates a respective control signal, dependent on the result of the comparison, for controlling the controllable contact or the respective controllable contacts. The advantage is that an analog circuit can also be used as a comparison device and thus a very fast reaction can be achieved when the value falls below the threshold. When the voltage drops, its value or profile is, for example, calculated in advance for a period of time which is equal to or greater than the reaction time for controlling the contact. Calculating the voltage in advance is therefore considered advantageous in motor operation.

According to example embodiments, the minimum tripping current of the first fuse is greater, e.g., at least five times or at least two times greater, than the minimum tripping current of the fuse connected in parallel to the further contact. For example, the minimum tripping current of which is greater, e.g., at least five times or at least two times greater, than the minimum tripping current of the fuses connected in parallel to the further contacts. The advantage is that protection is achieved for high voltages and adequate protection is also achieved for lower voltages, which protection cannot be guaranteed by the first fuse. Thus, in different voltage ranges, a respectively different voltage is active to generate the protection.

According to example embodiments, the control electronics are fed from a supply voltage, and, for example, if they fail, the contact or all contacts are opened. The advantage is that a supply voltage can be used in a simple manner in order to achieve safety independently of the voltage present at the stored energy source. A voltage of 24 volts can, for example, be used as the supply voltage.

According to example embodiments, the stored energy source has a double-layer capacitor or is arranged as a double-layer capacitor. For example, the double-layer capacitor is arranged as an ultracap. The advantage is that the stored energy source can be produced inexpensively and can have a large capacity in a simple manner.

According to example embodiments, the respective fuse is arranged as a semiconductor fuse. The advantage is that the fuse can be used several times, thus reducing costs.

According to example embodiments, the control electronics also function as the signal electronics of the inverter, in which the control electronics generate pulse-width-modulated control signals which are fed to controllable semiconductor switches which are arranged in half-bridges connected in parallel, and the AC voltage feeding the motor can therefore be provided at the AC-voltage-side connection of the inverter. The advantage is that the signal electronics of the inverter, which are present anyway, can be used to improve safety by using different fuses.

According to an example embodiment of the present invention, in a method for operating an installation, an electric motor is operated as a motor or as a generator. During motor operation, the contact or contacts are opened as a function of the voltage detected at the DC-voltage-side connection of the inverter. During generator operation, the motor current is detected at the AC-voltage-side connection of the inverter, and the value of the voltage present at the DC-voltage-side connection of the inverter is determined, e.g., calculated in advance, at a future time t+Δt relative to the current time t with a time interval Δt, and the contact or contacts are controlled, e.g., closed, as a function of this voltage determined in this manner.

The advantage is that the safety and the protection provided by the different fuses can be provided promptly.

According to example embodiments, the period of time equals or exceeds the reaction time of a respective controllable contact. The advantage is that the safety can thus be predictively guaranteed and provided in an improved manner adapted to the voltage to be expected.

According to example embodiments, the voltage currently detected, i.e., at time t, and the capacity of the stored energy source are also taken into account when determining the voltage expected at time t+Δt. The advantage is that the current generated by the generator and the voltage at the DC-voltage-side connection of the inverter are detected, and the generator power can be determined therefrom. Assuming that this power is also constant up to time t+Δt, the future applied voltage can be calculated in advance and the contacts controlled appropriately to ensure optimal safety, taking into account the capacity of the stored energy source and the current voltage present at the stored energy source, i.e., at time t.

Further features and aspects of example embodiments of the present invention are explained in more detail below with reference to the appended schematic Figures.

DETAILED DESCRIPTION

Figure 1:
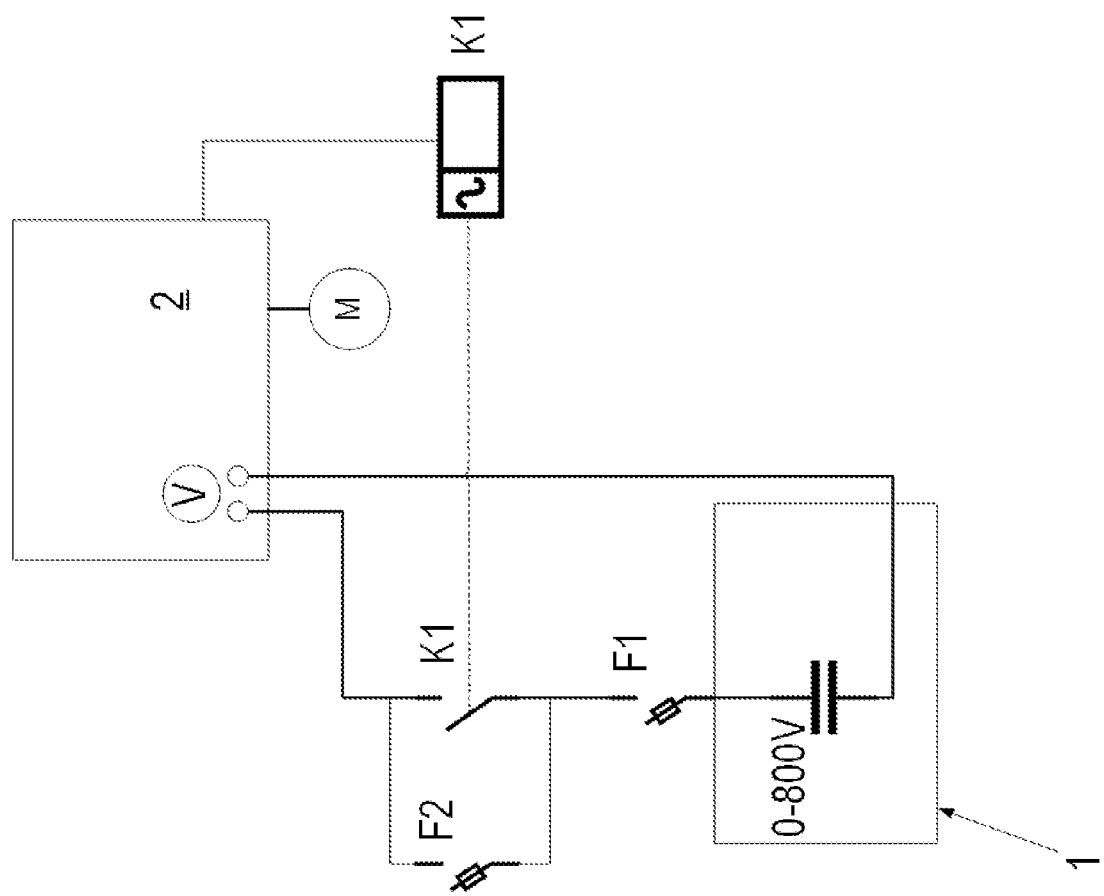
FIG. 1 schematically illustrates an installation according to an example embodiment of the present invention having a stored energy source 1 and an electric motor M that can be fed by an inverter 2.

As schematically illustrated in FIG. 1, the stored energy source 1 has a voltage between 0 volts and a maximum value, for example, 800 volts, depending on its state of charge.

The stored energy source is, for example, formed from double-layer capacitors, e.g., ultracaps. As an alternative or in addition, the stored energy source has energy storage cells that work electrochemically, e.g., it therefore has accumulator cells or battery cells.

An inverter 2, which feeds an electric motor M, is supplied from the stored energy source 1.

The voltage V occurring at the connection of the inverter 2 on the DC-voltage-side is detected and a controllable contact K1, e.g., a contactor, a relay, etc., is controlled depending on the detected value of the voltage V.

A second fuse F2, connected in series to a first fuse F1, can be bridged by contact K1.

The stored energy source 1 and the two fuses (F1, F2) are connected to one another in series, and the DC-voltage-side connection of the inverter 2 is fed from the series circuit formed in this manner.

For service purposes or for repairs, the stored energy source 1 must be discharged so that there is no danger from the stored energy source 1.

For this purpose, the first fuse F1 is configured such that it has a minimum tripping current that is higher than the second fuse F2, e.g., at least five times or at least two times as high.

For example, the minimum tripping current of the first fuse F1 is approximately 300 amperes and the minimum tripping current of the second fuse F2 is approximately 50 amperes.

In a first voltage range, which is above a first threshold of the voltage V, contact K1 is closed, so that protection is provided only by the first fuse F1.

For example, the first threshold is 260 volts.

In a second voltage range, which is above a second threshold of the voltage V and below the first threshold of the voltage V, contact K1 is opened and the second fuse F2 is therefore active.

For example, the second threshold is 24 volts.

There is no hazardous voltage below the second threshold.

According to example embodiments of the present invention, the voltage at the DC-voltage-side connection of the inverter 2 is detected and compared at least to the first threshold, e.g., by a comparison device included in the inverter 2. If the voltage is less than the first threshold, the comparison device generates a control signal which causes the first contact K1 to open.

Thus, the internal resistance of the stored energy source 1 causes lower currents below the minimum tripping current of the first fuse F1 at these lower voltages; however, at these lower voltages, which are below the first threshold, contact K1 is opened so that the second fuse F2 is effective and, in the event of a fault, e.g., a short-circuit on the inverter side, the minimum tripping current of the second fuse F2 may indeed be reached.

The internal resistance of the stored energy source 1 is up to 120 milliohms, for example.

Figure 2:
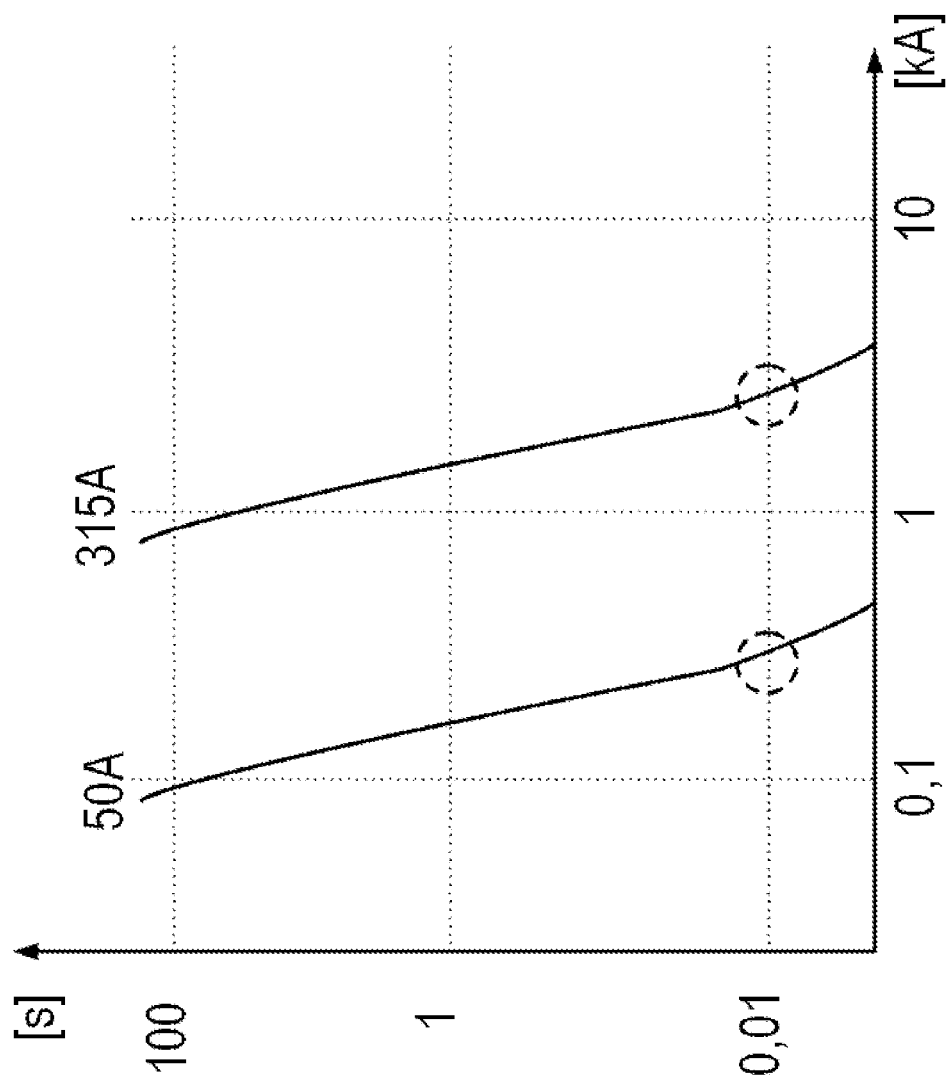
FIG. 2 schematically illustrates the characteristic curves of the tripping current as a function of the duration of the occurrence of this tripping current.

As illustrated in FIG. 2, the respective fuse (F1, F2) trips at the respective minimum tripping current if this occurs continuously, i.e., for example, for more than two or ten minutes. Faster tripping can only be effected by a stronger current.

Fuse F1 is, for example, arranged as a semiconductor fuse and fuse F2 as a full-range fuse.

The control electronics of the inverter 2 are configured such that no current is supplied to the electric motor M below the first threshold and/or no torque can be built up by the electric motor below the first threshold. In addition, below the threshold from the voltage V present at the DC-voltage-side, only electrical devices arranged in a control cabinet including the inverter 2 are supplied with power, and the electronics required for charging or discharging the stored energy source 2, e.g., the charger, are supplied with power.

The contactor can be controlled by control electronics, which are arranged in the control cabinet separately from the inverter 2 or are integrated in the inverter 2. The control electronics are, for example, also supplied with a voltage of 24 volts. However, if the power supply to the control electronics fails, contact K1 is de-energized and therefore drops out, e.g., it opens. In this manner, the second fuse with the lowest minimum tripping current is active and disconnects the stored energy source 2 when the minimum tripping current of this fuse F2 is exceeded.

In further exemplary embodiments according to the present invention, safety-related state detection is provided for contact K1 by providing an auxiliary contact. This prevents overloading of fuse F1 in the event of a fault. In the event of this fault, the electric motor is switched off by the control electronics.

Since the switching state of contact K1 can thus be identified in a safety-related manner and reliably, fuse F2 can then also be arranged as a semiconductor fuse. Thus, both fuses F1 and F2 can then be implemented as semiconductor fuses.

The auxiliary contact at contact K1 is also considered advantageous because it can be used to detect sticking of contact K1, e.g., of the contactor contact.

In further exemplary embodiments according to the present invention, the series circuit has not only the first fuse F1 and the second fuse F2, to which the first contact K1 is connected in parallel, but also a third or further fuses, each of which has a respective further contact connected in parallel. A respective contact can thus be opened for a respective voltage range. A fuse for a respective minimum tripping current can therefore be provided in the respective voltage range. The contacts are controlled either by control electronics of the inverter 2 or by separate control electronics arranged in the control cabinet that includes the inverter.

In contrast to the power electronics of the inverter 2, the control electronics mentioned here are only arranged respectively as signal electronics and therefore conduct only harmless voltages, e.g., voltages that are less than the second threshold.

LIST OF REFERENCE CHARACTERS

1 Stored energy source
2 Inverter
K1 Controllable contact, e.g., a contactor
F1 First fuse
F2 Second fuse
V Voltage at the DC-voltage-side input of the inverter 2
M Electric motor

The invention claimed is:

1. An installation, comprising:
a stored energy source;
a first fuse;
a further fuse, the stored energy source, the first fuse, and the further fuse arranged as an electrical series circuit;
a controllable contact arranged in parallel to the further fuse;
a voltage detection device adapted to detect a voltage applied to the series circuit connected to control electronics adapted to generate a control signal for the controllable contact; and
an electric motor selectively operatable as a motor or as a generator;
wherein the control electronics is adapted to open the controllable contact, during motor operation, as a function of a voltage detected at a DC-voltage-side connection of an inverter; and
wherein the control electronics is adapted to detect a motor current at an AC-voltage-side connection of the inverter and to control and/or close the controllable contact, during generator operation, as a function of a value of voltage present at the DC-voltage-side connection of the inverter that is determined at a future time relative to a current time within a time interval.

2. The installation according to claim 1, wherein the further fuse includes a plurality of further fuses, the controllable contact includes a plurality of controllable contacts, each controllable contact being connected in parallel to a respective one of the further fuses, the control electronics being adapted to generate control signals for the controllable contacts.

3. The installation according to claim 2, wherein a minimum tripping current of the first fuse is greater than, at least five times greater than, and/or at least two times greater than a minimum tripping current of each of the further fuses.

4. The installation according to claim 1, wherein the controllable contact includes a switch and/or a contactor.

5. The installation according to claim 1, wherein the controllable contact is adapted to open in response to the voltage falling below a voltage threshold.

6. The installation according to claim 1, wherein the control electronics include a comparison device adapted to compare the voltage with at least one threshold and to generate a respective control signal, based on a result of the comparison, to control the controllable contact.

7. The installation according to claim 1, wherein a minimum tripping current of the first fuse is greater than a minimum tripping current of the further fuse.

8. The installation according to claim 7, wherein the minimum tripping current of the first fuse is at least five times and/or at least two times greater than the minimum tripping current of the further fuse.

9. The installation according to claim 1, wherein the control electronics are adapted to be fed from a supply voltage.

10. The installation according to claim 9, wherein the contact is adapted to open in response to failure of the control electronics.

11. The installation according to claim 1, wherein the stored energy source is arranged as and/or includes a double-layer capacitor and/or an ultracap.

12. The installation according to claim 1, wherein the first fuse and/or the further fuse is arranged as a semiconductor fuse.

13. The installation according to claim 1, wherein the control electronics are arranged as signal electronics of the inverter, the control electronics being adapted to generate pulse-width-modulated control signals fed to controllable semiconductor switches arranged in half-bridges connected in parallel, and an AC voltage feeding the motor being arranged at the AC-voltage-side connection of the inverter.

14. The installation according to claim 1, wherein the electric motor is adapted to be fed by the inverter, the series circuit being adapted to feed the DC-voltage-side connection of the inverter.

15. The installation according to claim 14, wherein the control electronics include a comparison device adapted to compare the voltage with at least one threshold and to generate a respective control signal, based on a result of the comparison, to control the controllable contact.

16. The installation according to claim 14, wherein a minimum tripping current of the first fuse is greater than a minimum tripping current of the further fuse.

17. The installation according to claim 16, wherein the minimum tripping current of the first fuse is at least five times and/or at least two times greater than the minimum tripping current of the further fuse.

18. The installation according to claim 14, wherein the control electronics are adapted to be fed from a supply voltage.

19. The installation according to claim 14, wherein the contact is adapted to open in response to failure of the control electronics.

20. The installation according to claim 14, wherein the stored energy source is arranged as and/or includes a double-layer capacitor and/or an ultracap.

21. The installation according to claim 14, wherein the first fuse and/or the further fuse is arranged as a semiconductor fuse.

22. The installation according to claim 14, wherein the control electronics are arranged as signal electronics of the inverter, the control electronics being adapted to generate pulse-width-modulated control signals fed to controllable semiconductor switches arranged in half-bridges connected in parallel, and an AC voltage feeding the motor being arranged at the AC-voltage-side connection of the inverter.

23. A method for operating an installation that includes a stored energy source, a first fuse, a further fuse, the stored energy source, the first fuse, and the further fuse arranged as an electrical series circuit, a controllable contact arranged in parallel to the further fuse, and a voltage detection device adapted to detect a voltage applied to the series circuit connected to control electronics adapted to generate a control signal for the controllable contact, comprising:
- selectively operating an electric motor as a motor or as a generator;
- wherein, during motor operation, the controllable contact is opened as a function of a voltage detected at a DC-voltage-side connection of an inverter; and
- wherein, during generator operation, a motor current is detected at an AC-voltage-side connection of the inverter, a value of voltage present at the DC-voltage-side connection of the inverter is determined at a future time relative to a current time with a time interval, and the contact is controlled and/or closed as a function of the determined voltage.

24. The method according to claim 23, wherein the time interval equals or exceeds a response time of the controllable contact.

25. The method according to claim 23, wherein the voltage determined at the current time and a capacity of the stored energy source are taken into account in the determination of the voltage expected at the future time.

* * * * *